H. S. GROCE.
TRACTOR.
APPLICATION FILED DEC. 27, 1919.
1,368,795.
Patented Feb. 15, 1921.
2 SHEETS—SHEET 1.
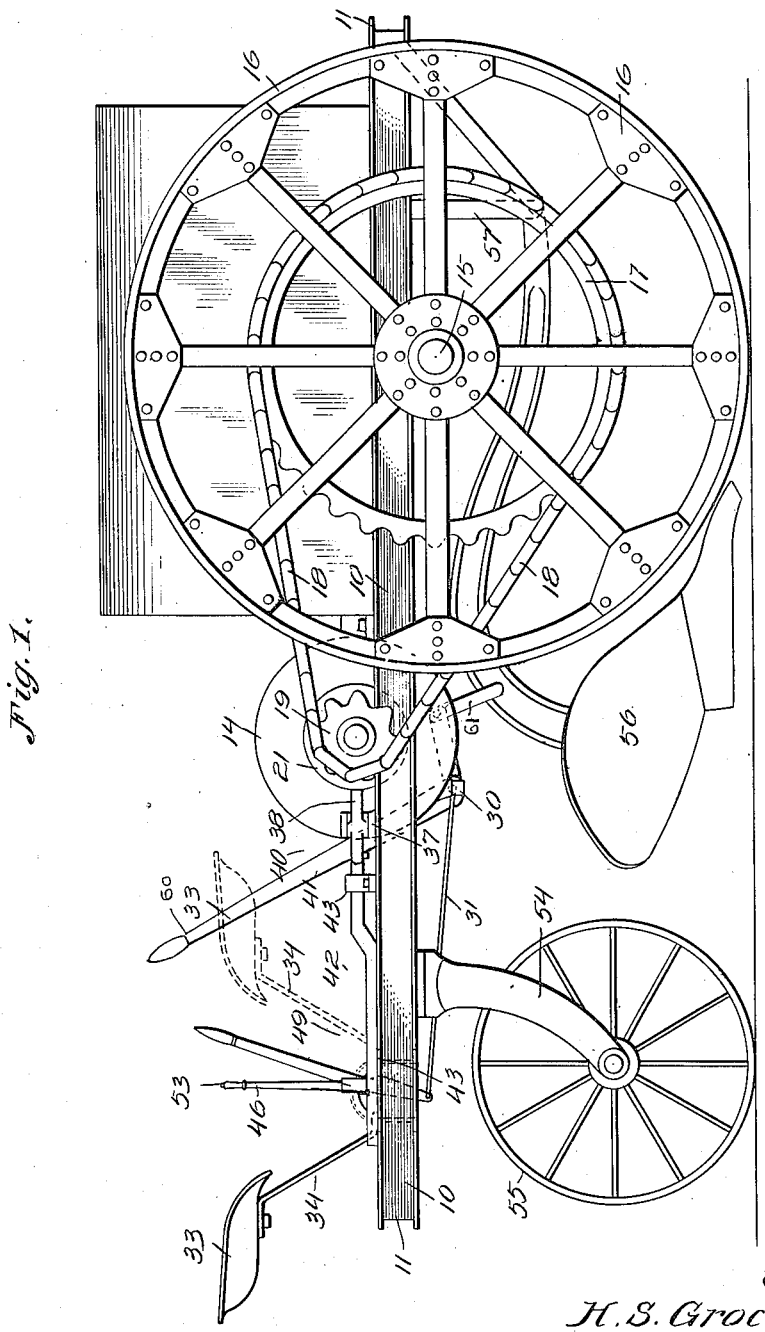
Inventor
H. S. Groce.
By Geo. P. Kimmel
Attorney

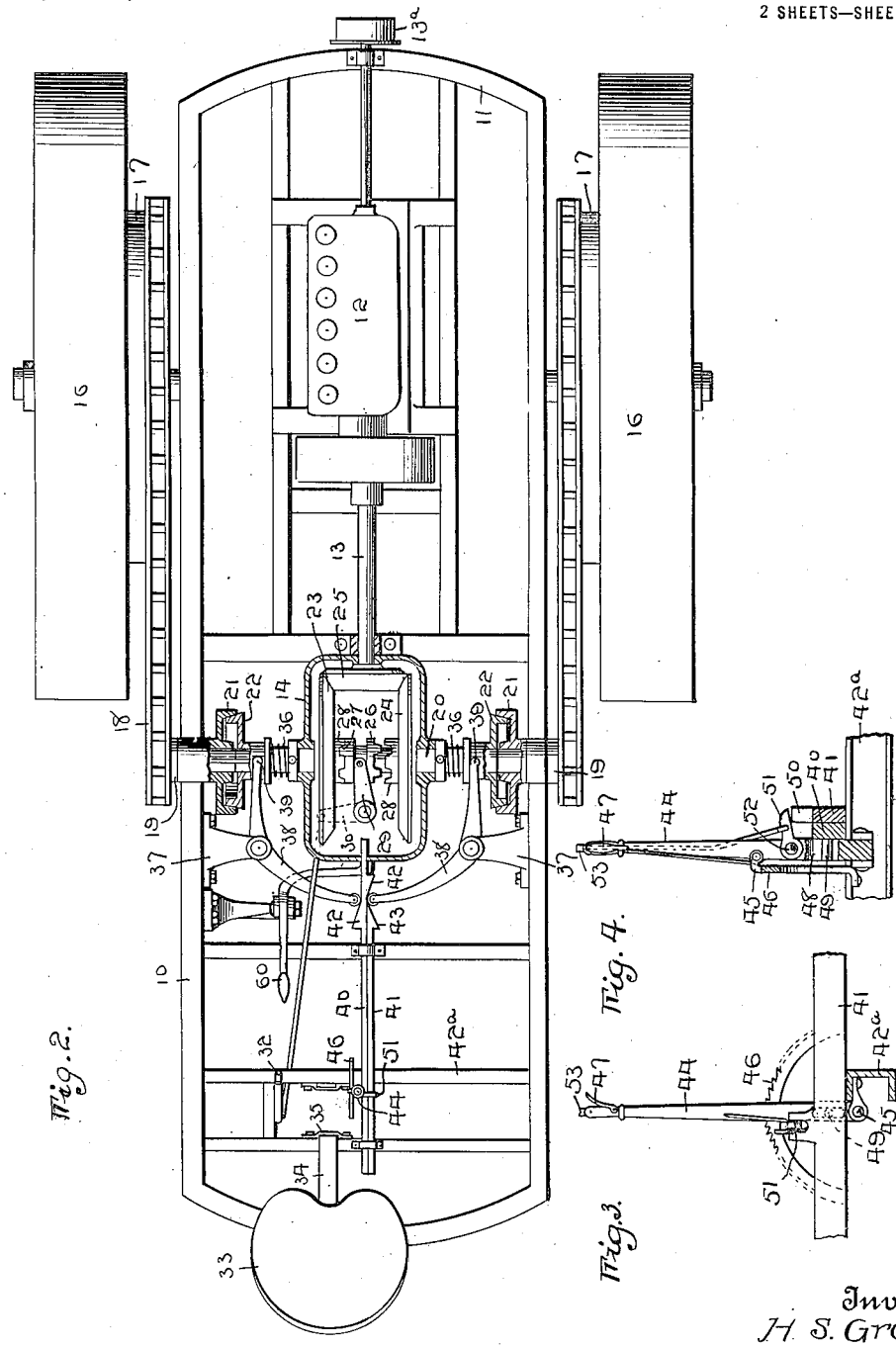

UNITED STATES PATENT OFFICE.

HENRY S. GROCE, OF DUNCAN, OKLAHOMA.

TRACTOR.

1,368,795. Specification of Letters Patent. Patented Feb. 15, 1921.

Application filed December 27, 1919. Serial No. 347,650.

*To all whom it may concern:*

Be it known that I, HENRY S. GROCE, a citizen of the United States, residing at Duncan, in the county of Stephens and State of Oklahoma, have invented certain new and useful Improvements in Tractors, of which the following is a specification.

The invention relates to a tractor, and more particularly to the class of reversible tractors for farm work.

The primary object of the invention is the provision of a tractor of this character, wherein traction wheels are located in a manner so that when the said tractor is employed for heavy haulage the load can be pulled thereby and in the use of soil working implements the same will be reversely drawn relative to the manner of hauling of the heavy load by said tractor, thereby making the latter handy for various characters of work.

Another object of the invention is the provision of a tractor of this character, wherein short turns can be made thereby to either side of its line of draft, thereby enabling the working of implements advanced thereby close to the marginal portions of a field and at corners thereof, as well as when traveling in transit over roads or the like.

Another object of the invention is the provision of a tractor of this character, wherein ground working implements, such as a plow, can be attached beneath the frame of the tractor close to the traction wheel spindle axis, thereby enabling the full cutting action of the plow in congested places and the sharp turning of the tractor when required.

A still further object of the invention is the provision of a tractor of this character, which is capable of being advanced in the direction of either of its ends, and the regulation of the same is at all times under the control of the operator, the control being simple and readily and easily actuated at the will of said operator.

There are various other objects and advantages of this invention besides the above and all of which will be hereinafter more fully or particularly brought out in the following specific description of the present preferred embodiment of the invention, the same being illustrated in the accompanying drawings, wherein:—

Figure 1 is a side elevation of a tractor constructed in accordance with the invention showing a plow attached thereto and mounted relative to the same, the view showing by full lines one position of the operator's seat when the tractor is advanced in one direction for the pulling of the plow and by dotted lines the other position of the seat when said tractor is employed for haulage.

Fig. 2 is a top plan view, showing the transmission casing in horizontal section.

Fig. 3 is a fragmentary elevation of the clutch controlling lever.

Fig. 4 is a fragmentary vertical longitudinal sectional view showing in elevation the clutch controlling lever, the latter being partly in section and the cam operated thereby.

Similar reference characters indicate corresponding parts throughout the several views in the drawings.

Referring to the drawings in detail the tractor comprises a main frame or chassis 10, in this instance, preferably of elongated rectangular shape having slightly outwardly bowed opposite ends 11, yet it is to be understood that the frame or chassis can be of any other desirable shape and has suitably supported thereon adjacent to one end of the same a motor 12, preferably of the internal combustion type, the same being located centrally of the frame or chassis and has its power shaft 13 extended to the intermediate portion of the frame and within a transmission casing 14 which is suitably mounted in said frame or chassis and is of any approved construction.

Suitably connected with the frame or chassis 10 and disposed transversely thereof beneath the same immediately under the motor 12 are stub axles 15 loosely supporting at its outer ends relatively large traction wheels 16 which are also of any desired construction having on their inner sides sprockets 17 over which are trained endless sprocket chains 18, the same being also trained over sprocket gears 19 fixed to opposite ends of a counter or transmission shaft 20 the same being suitably journaled upon the frame or chassis 10 intermediate its ends and transversely thereof to extend centrally through the transmission casing 14 as is clearly shown in Fig. 2 of the drawings.

The sprocket gears 19 are free upon the counter or transmission shaft 20 and carry internal friction clutch disks 21, while splined or otherwise slidably connected with said shaft 20 are companion clutch disks 22 adapted for engagement with and disengagement from the internal friction clutch disks 21 in a manner hereinafter fully described.

Arranged within the transmission casing 14 and loose upon the counter or transmission shaft 20 are reversing transmission gears 23 and 24 respectively, the same being in meshing engagement with a pinion 25 fixed to the power shaft 13 of the motor, the said pinion being located within the transmission casing 14, while between said gears 23 and 24 and splined or otherwise keyed for sliding movement upon the counter or transmission shaft 20 is a double clutch sleeve 26, the clutch ends 27 being adapted for alternate engagement with companion clutch hubs 28 on the gears 23 and 24 so that either of these gears can be locked with the counter or transmission shaft upon the shifting of the double clutch sleeve 26 in a manner presently described.

Suitably journaled for movement in the transmission casing 14 is a shifting yoke 29 engaging the double clutch sleeve 26 and this yoke carries a right angular arm 30 to which is connected a shift rod 31 the same being also connected to a hand operable throw lever 32 suitably mounted upon the frame or chassis 10 at a convenient location relative to an operator's seat 33, the standard 34 of which is removably fitted within a socket strap or keeper 35 on said frame or chassis, adjacent to one end thereof and in this manner the said seat 33 can be readily reversed so that the operator can face the direction in which the tractor is moving.

It will be clearly apparent that when operating the hand lever 32 the double clutch sleeve 26 can be shifted for the alternate engagement thereof with either of the gears 23 and 24 so that power from the engine or motor 12 can be transmitted through its power shaft 13 and either of the gears 23 and 24 to the counter or transmission shaft 20 for imparting motion to the traction wheels 16 to propel the tractor in the direction of either end thereof.

Surrounding the counter or transmission shaft 20 and working against the clutch disks 22 are coiled expansion springs 36 which serve to normally hold the said clutch disks 22 in positive clutching engagement with the internal friction clutch disks 21 so that motion from the transmission shaft 20 will be conveyed through the sprocket chains 18 to the traction wheels 16 of the tractor.

The power or engine shaft 13 is preferably suspended from one end of the frame or chassis 10 and is provided with a pulley 13ª adapted to receive a belt or other power transmitting device whereby the power of the engine 12 may be utilized in the operation of machinery.

Mounted upon the frame or chassis 10 on opposite sides of the transmission casing 14 are brackets 37 in which are pivotally mounted angular levers 38 provided with suitable yoke ends 39 engaging the clutch disks 22 to permit the same to be moved into and out of engagement with the internal friction clutch disks 21 on actuating either or both of the levers 38, the latter being operatively arranged relative to actuating rods 40 and 41 slidably mounted in suitable guides carried by the sill members 42ª of the frame structure 10. The rod 40 is provided with opposed lateral projections 42 arranged on opposite sides thereof and having inclined outer faces, the relatively small extremities of the substantially wedge shaped projections being arranged adjacent to each other whereby to permit the inner extremities of the levers 38 to move closely together, as suggested in Fig. 2, whereby the levers may be rocked by the springs 36 to permit both clutches to engage. However, as the rod 40 is reciprocated longitudinally in opposite directions, the opposed levers 38 are alternately rocked on their pivotal axis thereby alternately releasing the clutches. The other rod 41 is provided terminally with a single lateral projection 43 which, when the two rods 40 and 41 are moved longitudinally in unison, causes both levers 38 to be simultaneously rocked consequently throwing both clutches out.

The alternate or simultaneous adjustment of the rods 40 and 41 is manually effected by means of a lever 44 which is pivotally mounted at 45 in a bracket attached to one of the sills 42ª and having its opposite extremity located within convenient reach of the driver or operator of the tractor. The lever is locked in various adjusted positions by means of a pivoted pawl 45 engageable with opposed sets of ratchet teeth carried by a segment 46 whereby the lever is rigidly locked in adjusted position against accidental displacement. Adjustment of the pivoted pawl 45 is effected by proper manipulation of a handle 47 carried by the upper extremity of the lever 44 and the latter is provided adjacent its lower extremity with a vertically elongated slot 48 receiving a rigid laterally projecting pin 49 carried by the rod 40 whereby the swinging movement of the lever 44 longitudinally of the frame 10 produces a longitudinal movement of the rod 40 engaging one or the other of the projections 42 with the lever 38 associated therewith, according to the direction in which the lever is swung.

The upper edges of the rods 40 and 41 are provided with recesses 50 which, when the rod 40 is moved to its intermediate position as shown in Fig. 2, register with each other so as to receive a pawl 51 pivotally secured at 52 to the lever 44 whereby the rods 40 and 41 are rigidly locked against independent movement and thus when longitudinal movement is imparted to the rod 40 toward the transmission casing 14, the rod 41 is moved therewith and the projections 42 and 43 entering between the adjacent terminals of the levers 38 separate the latter causing simultaneous disengagement or release of the clutches. The pawl 51 is conveniently operable by a depressible button 53 slidably mounted in the upper extremity of the lever 44 and which is preferably provided with suitable spring means (not shown) which, when the button is released, automatically elevates the latter withdrawing the pivoted pawl 51 from engagement with the rods 40 and 41 thus permitting adjustment of the rod 40 independently of the rod 41.

A plow 56 is pivotally suspended beneath the frame structure 10 by a suitable type of hanger 57 and is preferably connected with a manually operable lever 60 having an angular extremity connected with the beam of the plow 56 through a link 61.

Suitably swiveled or otherwise rotatably mounted in the frame or chassis 10 near the end remote from the main power axle 15 is a caster wheel fork 54 which has journaled therein a center caster wheel 55 which supports the tractor at this end and it will be obvious that the major weight upon the frame or chassis 10 located at the axle end thereof or adjacent thereto. The caster wheel 55 constitutes the guide wheel of the tractor and it automatically adjusts itself on power being imparted to the respective traction wheels 16 of said tractor.

It is clearly apparent that the tractor by reason of its particular construction can be driven in the direction of either of its ends and in the use thereof for the haulage of heavy loads the said tractor pulls such loads and when adapted for attachment to ground working implements the same is propelled in a reverse direction to that for heavy loads. For example in the use of a plow 56 the same is attached to a hanger 57 upon the frame or chassis 10 of the tractor as is clearly shown in Fig. 1 of the drawings, the plow 56 being located in this particular position so as to permit the sharp short turning of the tractor in its use with the plow.

It will be clearly apparent that the caster wheel 55 adjusts itself on the reversal of power transmitted to the traction wheels 16 and the operator of the machine adjusts the seat 33 accordingly to the direction in which the tractor is to be moved, and the levers for controlling the said tractor are in convenient position for reach by the operator when in the seat. Furthermore, it will be clearly apparent that in the use of the tractor the same will turn in congested areas and is capable of very short turns when the same is used for the advancement of ground working implements, such as a plow or the like. From the foregoing it is thought that the construction and manner of operation of the tractor will be clearly understood and therefore a more extended explanation has been omitted.

Furthermore it is to be understood that changes, variations and modifications may be made in the invention as come properly within the scope of the appended claims, without departing from the spirit of the invention or sacrificing any of its advantages.

What is claimed is:

1. A tractor of the character described, comprising a frame, a rotary axle, traction wheels carried thereby, power operating means for driving said axle and wheels, a counter shaft carried by and substantially medially of said frame, gearing for driving said countershaft directly from the motor and traction wheels, independently operable spring controlled friction clutch disks on said counter shaft, clutch controlled transmission mechanism on said countershaft and between the friction clutch disks, brackets carried by said frame in proximity to said countershaft, levers pivotally mounted in said brackets and connected to said clutch disks, and longitudinally reciprocable rods coöperating with said levers for simultaneously or independently operating said clutch disks.

2. A tractor of the character described comprising a frame, a rotary axle, traction wheels carried thereby, power operating means at the front of said frame for driving said axle and wheels, a counter shaft carried by and substantially medially of said frame, friction gearing on said countershaft and directly operable from the power operating means, sprocket and chain gearing connecting the axle and countershaft outside of the frame, independently operable spring controlled friction clutch disks on said countershaft, clutch controlled transmission mechanism on said countershaft and between the friction clutch disks, brackets carried by the frame in proximity to said clutch disks, levers pivotally supported by said brackets for actuating said disks, rollers carried at the opposite terminals of said levers, longitudinally reciprocable rods carried by said frame, lateral projections formed on said rods, for engagement with said rollers, and adjustable lever controlled means for operating said rods simultaneously or independently to actuate said friction clutch disks.

In testimony whereof I affix my signature hereto.

HENRY S. GROCE.